United States Patent
Chen et al.

(10) Patent No.: US 9,024,497 B2
(45) Date of Patent: *May 5, 2015

(54) MOTOR WITH ROTOR POSITIONING COMPONENT

(71) Applicants: Chien-Jung Chen, Kaohsiung (TW); Hsien-Wen Liu, Kaohsiung (TW); Chih-Tsung Hsu, Kaohsiung (TW); Tzu-Wen Tsai, Kaohsiung (TW)

(72) Inventors: Chien-Jung Chen, Kaohsiung (TW); Hsien-Wen Liu, Kaohsiung (TW); Chih-Tsung Hsu, Kaohsiung (TW); Tzu-Wen Tsai, Kaohsiung (TW)

(73) Assignee: Yen Sun Technology Corp., Kaohsiung (TW)

( * ) Notice: Subject to any disclaimer, the term of this patent is extended or adjusted under 35 U.S.C. 154(b) by 170 days.

This patent is subject to a terminal disclaimer.

(21) Appl. No.: 13/750,316

(22) Filed: Jan. 25, 2013

(65) Prior Publication Data
US 2014/0210295 A1    Jul. 31, 2014

(51) Int. Cl.
*H02K 7/09* (2006.01)
*H02K 21/24* (2006.01)

(52) U.S. Cl.
CPC ...................................... *H02K 21/24* (2013.01)

(58) Field of Classification Search
USPC .................................. 310/156.32, 268, 68 B
See application file for complete search history.

(56) References Cited

U.S. PATENT DOCUMENTS

| 4,620,139 | A  | * | 10/1986 | Egami et al. | 318/400.01 |
| 4,757,222 | A  | * | 7/1988  | Shiraki et al. | 310/268 |
| 7,456,541 | B2 | * | 11/2008 | Horng et al. | 310/268 |
| 8,106,552 | B2 | * | 1/2012  | Kim et al. | 310/81 |

* cited by examiner

*Primary Examiner* — Dang Le
(74) *Attorney, Agent, or Firm* — Hunton & Williams LLP

(57) ABSTRACT

A motor includes a base, a rotor unit and a driving unit. The base has opposite first and second surfaces. The rotor unit includes a magnet unit disposed on a rotatable magnet carrier to face the first surface of the base. The driving unit includes a circuit board disposed between the base and the magnet unit, induction coils disposed on the circuit board and operatively associated with the magnet unit, a sensor unit disposed on the circuit board and spaced apart from the induction coils, and a rotor positioning component disposed on the second surface of the base and capable of magnet attraction with the magnet unit for positioning the rotor unit relative to the sensor unit when the rotor unit stops rotating.

2 Claims, 5 Drawing Sheets

MOTOR WITH ROTOR POSITIONING COMPONENT

BACKGROUND OF THE INVENTION

1. Field of the Invention

The present invention relates to a motor, more particularly to a motor with a rotor positioning component.

2. Description of the Related Art

Referring to FIG. 1, a conventional motor 1 includes a base 11, a circuit board 12, a rotor unit 13 and at least one rotor positioning component 14.

The circuit board 12 has two induction coils 121 and a sensor unit 122. The rotor unit 13 includes a magnet carrier 131 rotatable relative to the base 11, and a permanent magnet unit 132 disposed on the magnet carrier 131. The permanent magnet unit 132 is in a shape of a ring and has a plurality of magnetic pole regions 133 that are angularly disposed with respect to a rotation axis of the magnet carrier 131. Adjacent ones of the magnetic pole regions 133 have opposite magnetic polarities and form a border region 134 that extends radially with respect to the rotation axis. Magnetic strength at the border regions 134 is weaker than that at the magnetic pole regions 133. The rotor positioning component 14 is disposed on the circuit board 12 between the base 11 and the rotor unit 13, and is capable of magnetic attraction with the magnetic pole regions 133 of the permanent magnet unit 132.

The induction coils 121 are operatively associated with the permanent magnet unit 132 to generate a magnetic repulsion force for driving the rotor unit 13 to rotate relative to the base 11 about the rotation axis. When the induction coils 121 cease to generate the magnetic repulsion force to stop driving further rotation of the rotor unit 13, the magnetic attraction between the rotor positioning component 14 and one of the magnetic pole regions 133 of the permanent magnet unit 132 prevents the sensor unit 122 from overlapping with a projection of any one of the border regions 134 on the circuit board 12 once the rotor unit 13 stops rotating, thereby facilitating subsequent activation of the rotor unit 13.

However, since the rotor positioning component 14 is disposed between the circuit board 12 and the rotor unit 13, jamming of the rotor unit 13 may occur due to undesired removal of at least a part of the rotor positioning component 14 from the circuit board 12 after long-term use or as a result of vibration of the rotor positioning component 14 when the motor 1 is operational.

Moreover, while modifying the rotor positioning component 14 to be disposed on the base 11 and between the base 11 and the circuit board 12 may alleviate jamming of the rotor unit 13, vibration of the circuit board 12 while the motor 1 is operational may lead to short-circuit between the rotor positioning component 14 and the induction coils 121. While an insulation material may be applied on the rotor positioning component 14 to avoid such short-circuit, additional manufacturing time and costs will be incurred.

SUMMARY OF THE INVENTION

Therefore, an object of the present invention is to provide a motor that may alleviate the above drawbacks of the prior art.

Accordingly, a motor of the present invention comprises a base, a rotor unit and a driving unit.

The base has opposite first and second surfaces. The rotor unit includes a magnet carrier and a magnet unit. The magnet carrier is disposed to confront the first surface of the base and is rotatable relative to the base about a rotation axis. The magnet unit is disposed on one side of the magnet carrier and faces the first surface of the base. The magnet unit is in a shape of a ring and has a plurality of magnetic pole regions that are angularly disposed with respect to the rotation axis. Adjacent ones of the magnetic pole regions have opposite magnetic polarities and form a border region that extends radially with respect to the rotation axis.

The driving unit includes a circuit board, a plurality of induction coils, a sensor unit and a rotor positioning component. The circuit board is disposed between the base and the magnet unit. The induction coils are disposed on the circuit board and are operatively associated with the magnet unit to generate a magnetic repulsion force for driving the rotor unit to rotate relative to the base about the rotation axis. The sensor unit is disposed on the circuit board and is spaced apart from the induction coils for detecting the magnetic pole regions. The rotor positioning component is disposed on the second surface of the base and is capable of magnetic attraction with the magnetic pole regions of the magnet unit. Therefore, when the induction coils cease to generate the magnetic repulsion force to stop driving further rotation of the rotor unit, the magnetic attraction between the rotor positioning component and the magnet unit prevents the sensor unit from overlapping with a projection of any one of the border regions on the circuit board once the rotor unit stops rotating.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
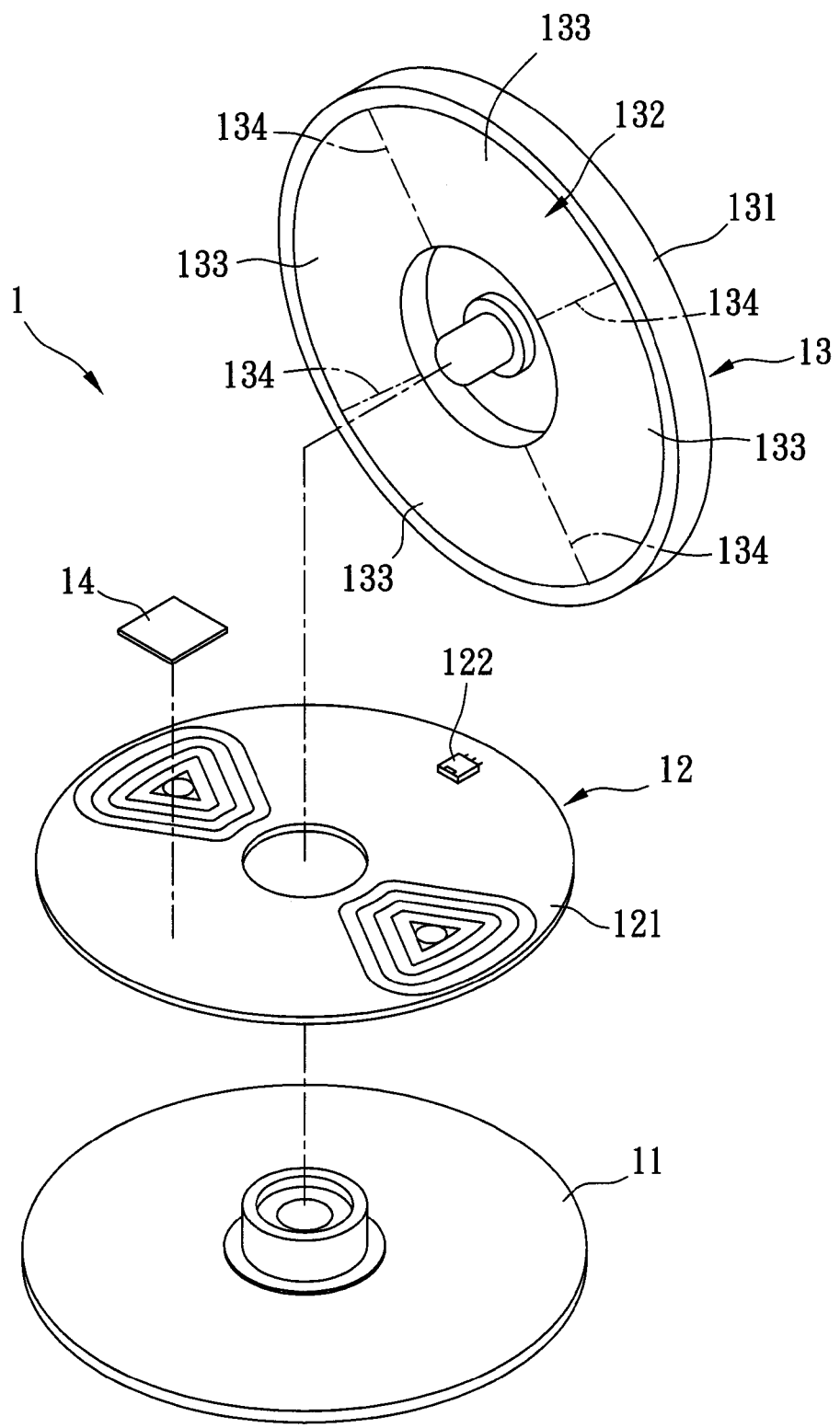
FIG. 1 is an exploded perspective view of a conventional motor.

Before the present invention is described in greater detail, it should be noted that like elements are denoted by the same reference numerals throughout the disclosure.

Figure 2:
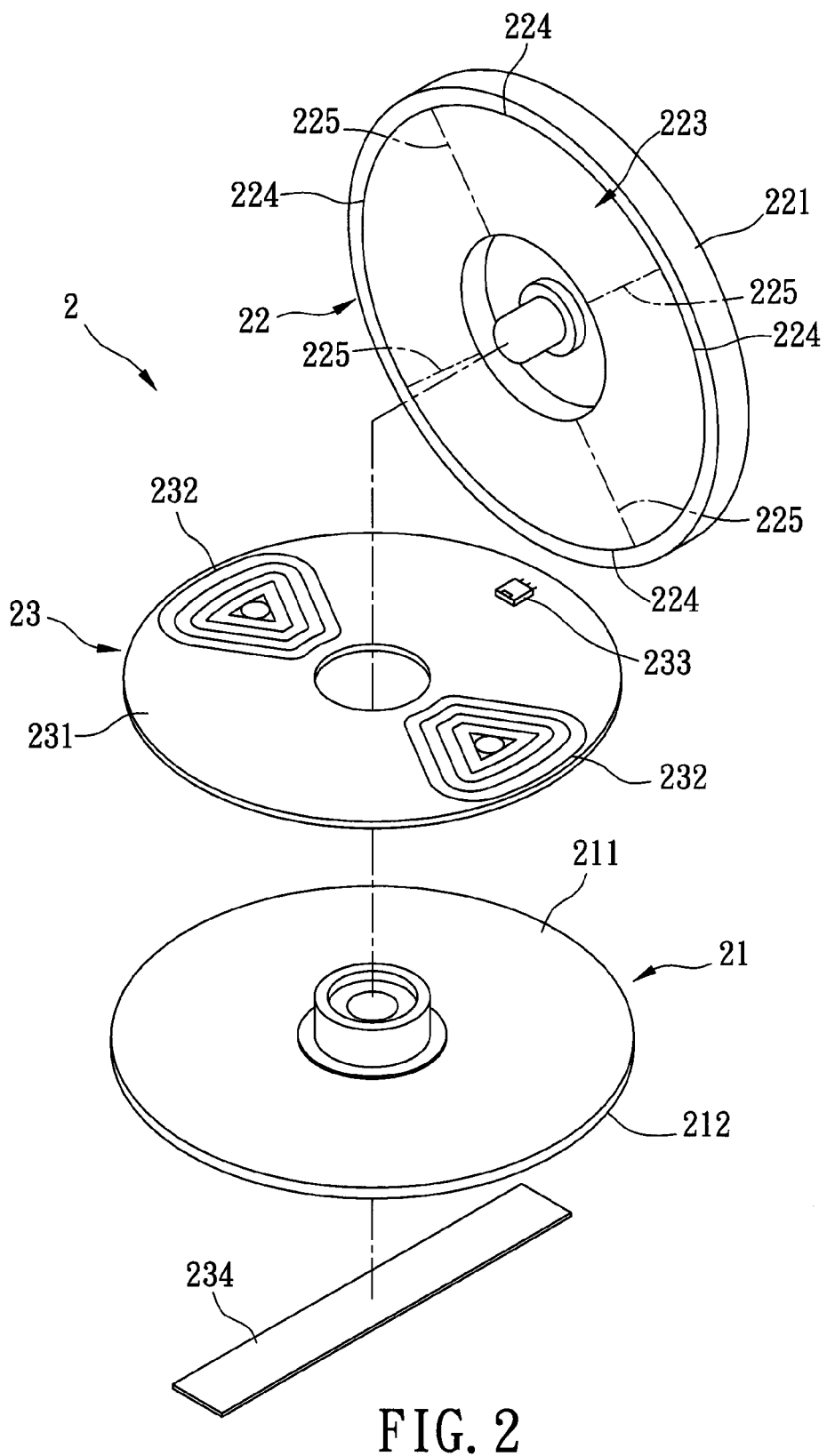
FIG. 2 is an exploded perspective view of a first preferred embodiment of a motor according to the present invention.

Referring to FIG. 2, the first preferred embodiment of a motor 2 according to the present invention is shown to comprise a base 21, a rotor unit 22, and a driving unit 23.

The base 21 has opposite first and second surfaces 211, 212.

The rotor unit 22 includes a magnet carrier 221 and a magnet unit 223. The magnet carrier 221 is disposed to confront the first surface 211 of the base 21 and is rotatable relative to the base 21 about a rotation axis. The magnet unit 223 is disposed on one side of the magnet carrier 221 and faces the first surface 211 of the base 21. The magnet unit 223 is in a shape of a ring and has a plurality of magnetic pole regions 224 that are angularly disposed with respect to the rotation axis. Adjacent ones of the magnetic pole regions 224 have opposite magnetic polarities and form a border region 225 that extends radially with respect to the rotation axis. Magnetic strength at the border regions 225 is weaker than that at the magnetic pole regions 224.

The driving unit 23 includes a circuit board 231, a plurality of induction coils 232, a sensor unit 233 and a rotor positioning component 234. The circuit board 231 is disposed between the base 21 and the magnet unit 223. In this embodiment, there are two induction coils 232 that are disposed spacedly on the circuit board 231 (such as by embedding) and that are operatively associated with the magnet unit 223 to generate a magnetic repulsion force for driving the rotor unit 22 to rotate relative to the base 21 about the rotation axis. The sensor unit 233 is disposed on the circuit board 231 and is spaced apart from the induction coils 232 for detecting the magnetic pole regions 224. The rotor positioning component 234 is disposed on the second surface 212 of the base 21 and is capable of magnetic attraction with the magnetic pole regions 224 of the magnet unit 223. Preferably, the rotor positioning component 234 is an elongate strip made of metal and attached to the second surface 212 of the base 21, such as with the use of adhesives, and the sensor unit 233 is a Hall element.

Figure 3:
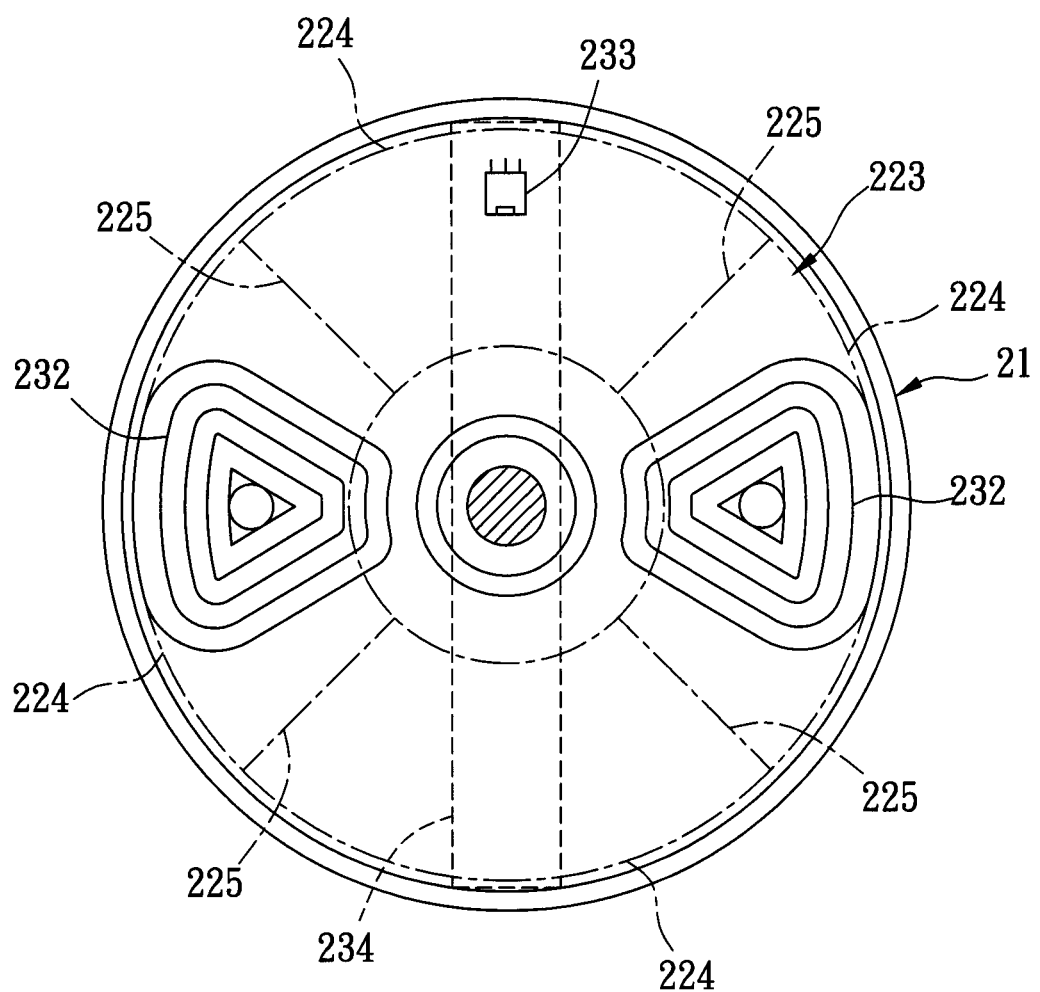
FIG. 3 is a schematic view showing a base and a driving unit of the first preferred embodiment.

FIG. 3 illustrates the first preferred embodiment without the magnet carrier 221 and with the magnet unit 223 shown in phantom line. When the induction coils 232 cease to generate the magnetic repulsion force to stop driving further rotation of the rotor unit 22, the magnetic attraction between the rotor positioning component 234 and the magnetic pole regions 224 prevents the sensor unit 233 from overlapping with a projection of any one of the border regions 225 on the circuit board 23 once the rotor unit 22 stops rotating. Therefore, when the rotor unit 22 is restarted, the sensor unit 233 can accurately detect the polarity of the magnetic pole region 224 adjacent thereto, and the induction coils 232 may be electrified to generate a magnetic repulsion force, thereby facilitating subsequent activation of the rotor unit 22.

In addition, disposing the rotor positioning component 234 on the second surface 212 of the base 21 is relatively easy, and can prevent jamming of the rotor unit 22 when the rotor positioning component 234 is separated from the base 21, moreover, direct contact as well as short-circuit between the rotor positioning component 234 and the circuit board 231 can be prevented because of the base 21 that is made of an electrical insulating material. As a result, additional manufacturing time and costs will not be incurred, and operational stability and production efficiency of the motor 2 will be improved.

Figure 4:
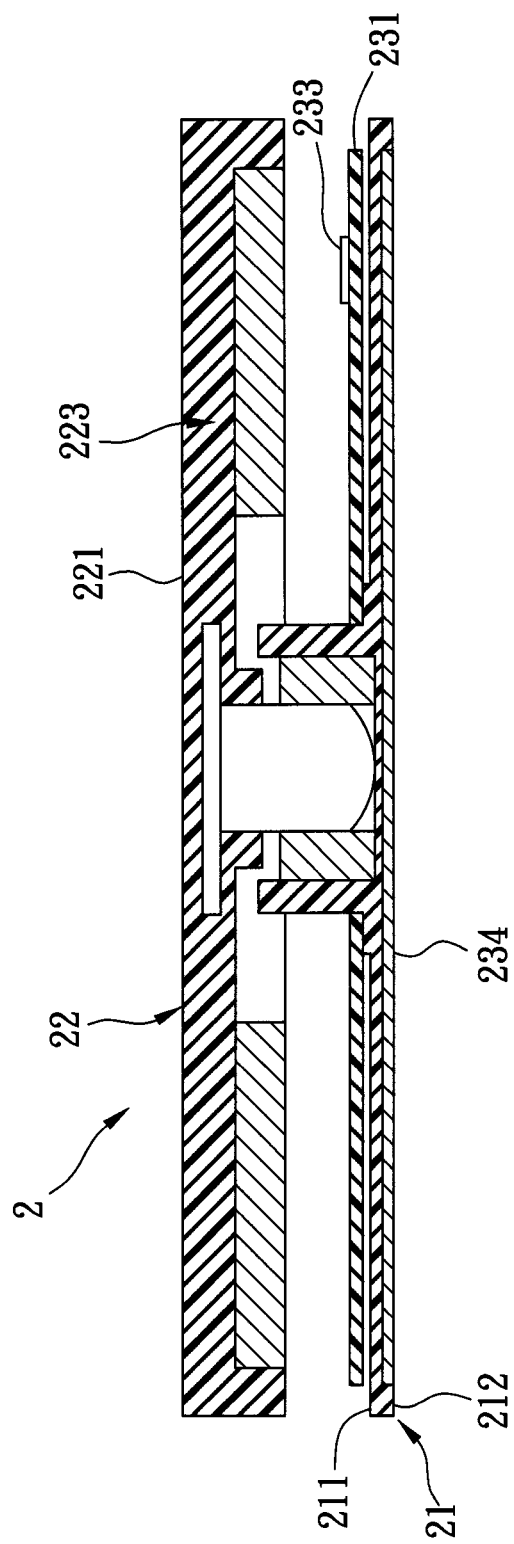
FIG. 4 is a sectional view of a second preferred embodiment of a motor according to the present invention.

FIG. 4 illustrates the second preferred embodiment of the motor 2 according to the present invention. The difference between this embodiment and the first preferred embodiment resides in that the rotor positioning component 234 is an elongate strip embedded in the second surface 212 of the base 21 so as to prevent separation between the rotor positioning component 234 and the base 21.

Figure 5:
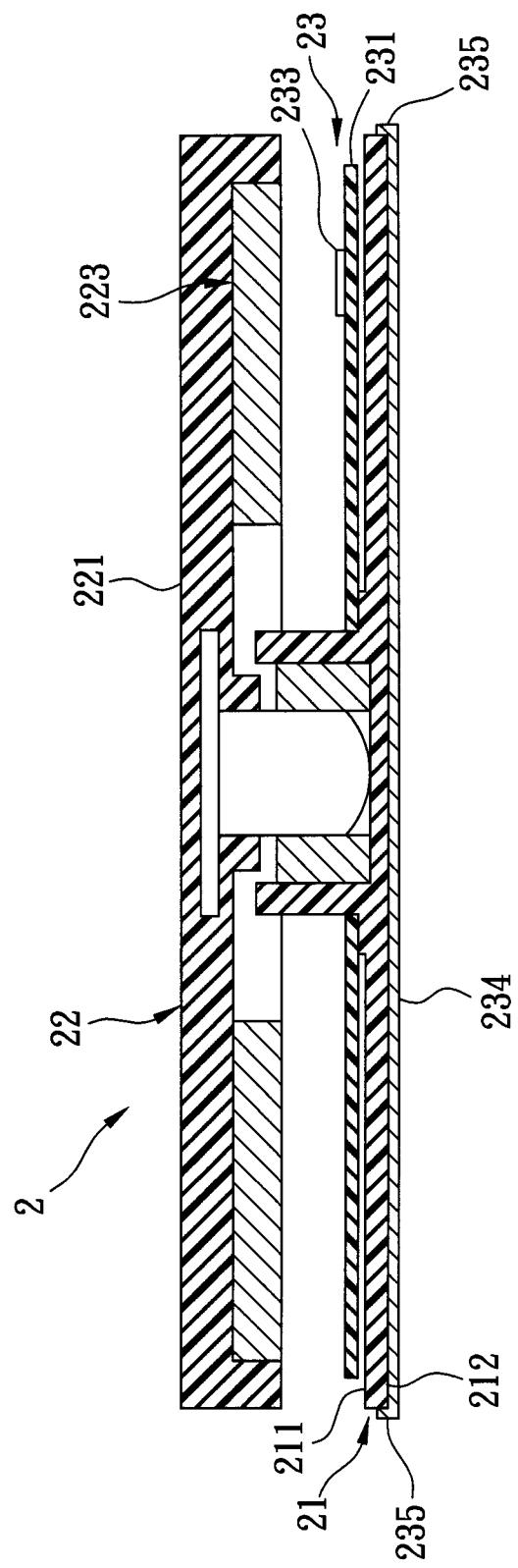
FIG. 5 is a sectional view of a third preferred embodiment of a motor according to the present invention.

FIG. 5 illustrates the third preferred embodiment of the motor 2 according to the present invention. The difference between this embodiment and the first preferred embodiment resides in that the rotor positioning component 234 is an elongate strip having two bent end parts 235 that engage a periphery of the base 21 and that help prevent separation between the rotor positioning component 234 and the base 21. Each of the bent end parts 235 has a tip that does not extend beyond the first surface 211 of the base 21 so as to prevent contact between the rotor positioning component 234 and the circuit board 231.

To sum up, when the induction coils 232 cease to generate the magnetic repulsion force to stop driving further rotation of the rotor unit 22, the magnetic attraction between the rotor positioning component 234 and the magnet unit 223 prevents the sensor unit 233 from overlapping with a projection of any one of the border regions 225 on the circuit board 231 once the rotor unit 22 stops rotating, thereby facilitating subsequent activation of the rotor unit 22. Furthermore, disposing the rotor positioning component 234 on the second surface 212 of the base 21 can prevent jamming of the rotor unit 22 when the rotor positioning component 234 is separated from the base 21. Moreover, direct contact as well as short-circuit between the rotor positioning component 234 and the circuit board 231 can be prevented because of the base 21 that is made of an electrical insulating material. As a result, operational stability and production efficiency of the motor 2 will be improved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A motor comprising:
   a base having opposite first and second surfaces;
   a rotor unit including a magnet carrier disposed to confront said first surface of said base and rotatable relative to said base about a rotation axis, and a magnet unit disposed on one side of said magnet carrier facing said first surface of said base, said magnet unit being in a shape of a ring and having a plurality of magnetic pole regions that are angularly disposed with respect to the rotation axis, adjacent ones of said magnetic pole regions having opposite magnetic polarities and forming a border region that extends radially with respect to the rotation axis; and
   a driving unit including a circuit board disposed between said base and said magnet unit, a plurality of induction coils disposed on said circuit board and operatively associated with said magnet unit to generate a magnetic repulsion force for driving said rotor unit to rotate relative to said base about the rotation axis, a sensor unit disposed on said circuit board and spaced apart from said induction coils for detecting said magnetic pole regions, and a rotor positioning component disposed on said second surface of said base and capable of magnetic attraction with said magnetic pole regions of said magnet unit such that, when said induction coils cease to generate the magnetic repulsion force to stop driving further rotation of said rotor unit, the magnetic attraction between said rotor positioning component and said magnet unit prevents said sensor unit from overlapping with a projection of any one of said border regions on said circuit board once said rotor unit stops rotating,
   wherein said rotor positioning component is an elongate strip having two bent end parts that engage a periphery of said base, each of said bent end parts having a tip that does not extend beyond said first surface of said base.

2. A motor comprising:
   a base having opposite first and second surfaces;
   a rotor unit including a magnet carrier disposed to confront said first surface of said base and rotatable relative to said base about a rotation axis, and a magnet unit disposed on one side of said magnet carrier facing said first surface of said base, said magnet unit being in a shape of a ring and having a plurality of magnetic pole regions that are angularly disposed with respect to the rotation axis, adjacent ones of said magnetic pole regions having opposite magnetic polarities and forming a border region that extends radially with respect to the rotation axis; and a driving unit including a circuit board disposed between said base and said magnet unit, a plurality of induction coils disposed on said circuit board and operatively associated with said magnet unit to generate a magnetic repulsion force for driving said rotor unit to rotate relative to said base about the rotation axis, a sensor unit disposed on said circuit board and spaced apart from said induction coils for detecting said magnetic pole regions, and a rotor positioning component disposed on said second surface of said base and capable of magnetic attraction with said magnetic pole regions of said magnet unit such that, when said induction coils cease to generate the magnetic repulsion force to stop driving further rotation of said rotor unit, the magnetic attraction between said rotor positioning component and said magnet unit prevents said sensor unit from overlapping with a projection of any one of said border regions on said circuit board once said rotor unit stops rotating;

wherein said rotor positioning component is an elongate strip embedded in said second surface of said base.

* * * * *